June 5, 1956     B. T. JOHNSON     2,748,691
BARBECUE MACHINE
Filed June 9, 1952     3 Sheets-Sheet 1
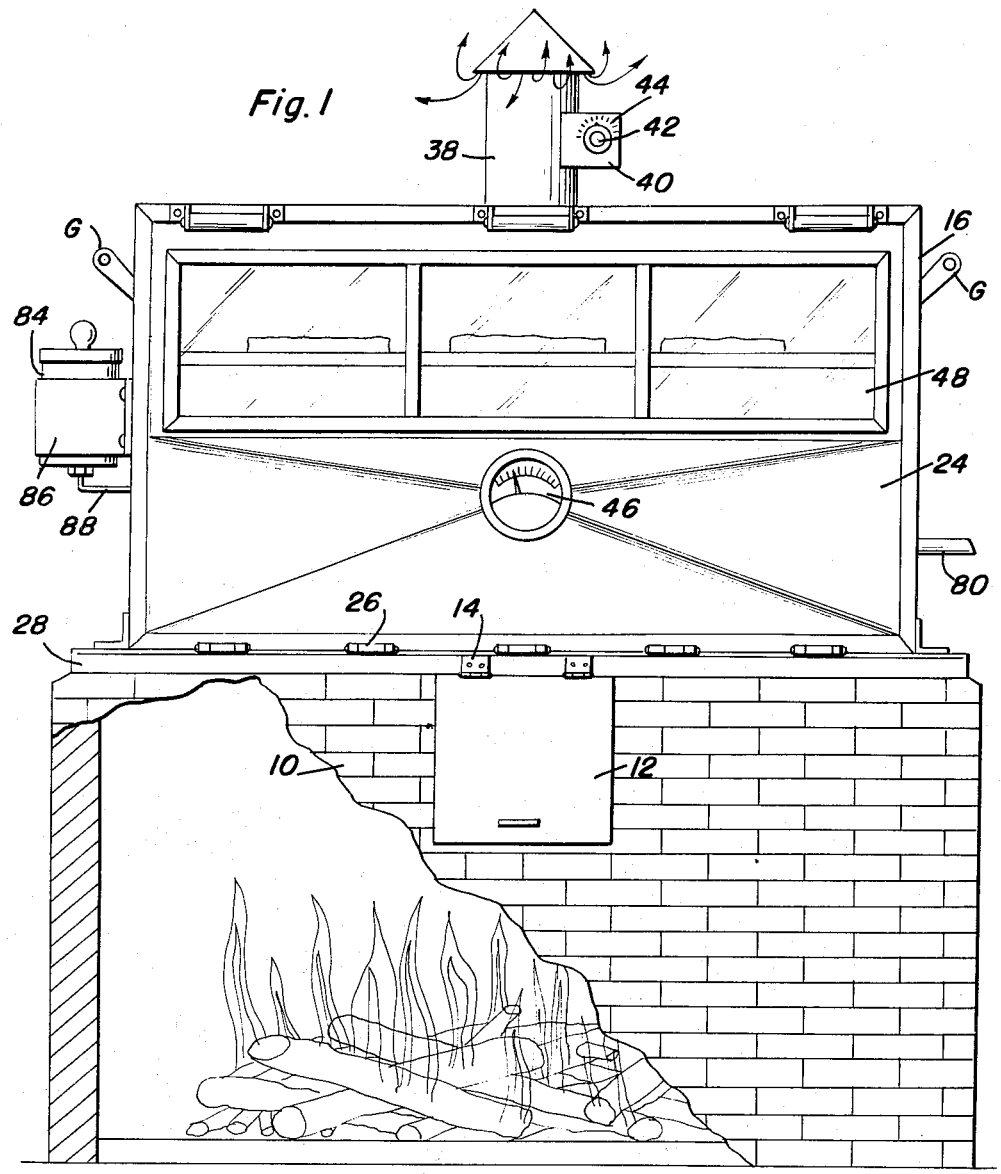
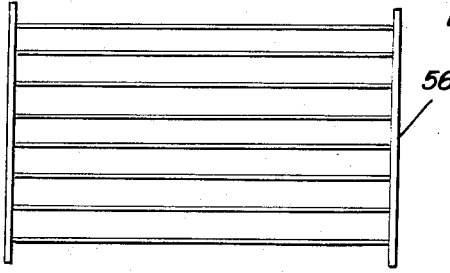
Bennie T. Johnson
INVENTOR.

Bennie T. Johnson
INVENTOR.

June 5, 1956

B. T. JOHNSON 2,748,691

BARBECUE MACHINE

Filed June 9, 1952

Bennie T. Johnson
INVENTOR.

BY
*Clarence A. O'Brien*
*and Harvey B. Jacobson*
Attorneys

United States Patent Office 2,748,691
Patented June 5, 1956

2,748,691

BARBECUE MACHINE

Bennie T. Johnson, Eastman, Ga.

Application June 9, 1952, Serial No. 292,512

6 Claims. (Cl. 99—444)

This invention relates to new and useful improvements in cooking apparatus and the primary object of the present invention is to provide a barbecue machine so constructed as to reduce the time required for properly cooking meat.

Another important object of the present invention is to provide a barbecue machine involving a heating chamber having a reservoir and grease collector supported therein beneath a meat rack whereby meat on the rack will be tenderized without basting and the grease drippings from the meat will be collected.

A further object of the present invention is to provide a barbecue machine including a heating compartment that is quickly and readily mounted upon a pit in a convenient manner and which compartment removably houses racks, whereby the components of the heating compartment may be cleaned and retained in a sanitary condition for continued use.

A still further aim of the present invention is to provide a barbecue machine of the aforementioned character that is simple and practical in construction, strong and reliable in use, small and compact in structure, efficient and durable in operation, inexpensive to manufacture, install and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the present invention and with parts of the fire box or pit broken away;

Referring now to the accompanying drawings in detail, wherein for the purpose of illustration, there is disclosed a preferred embodiment of the present invention, the numeral 10 represents a fire box or pit composed of brickwork and having an open top. The fire box 10 is also provided with an opening in its front wall that is normally closed by a vertically swingable closure 12 hinged, as at 14, to the front wall of the fire box above the opening.

Figure 2:
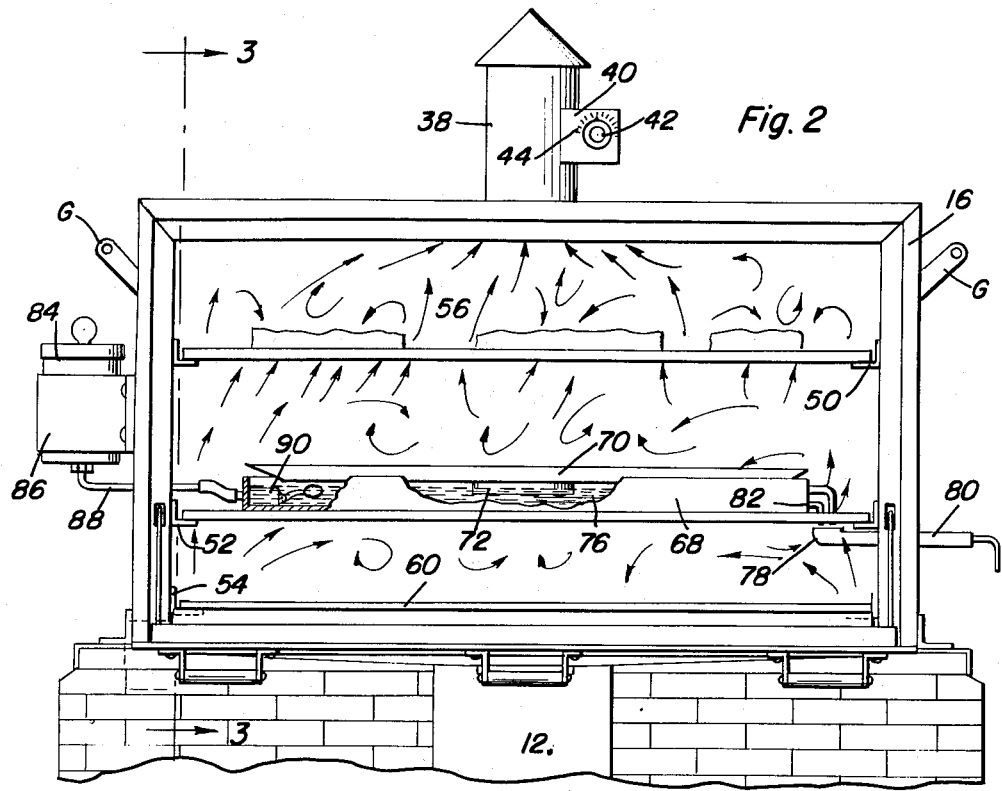
Figure 2 is a fragmentary view of Figure 1 and with the closure for the heating chamber in its open position.
Figure 4:
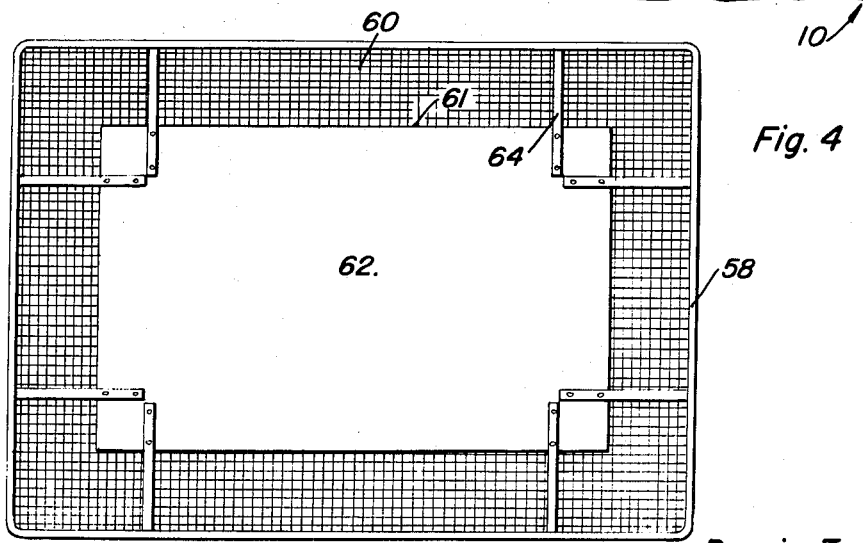
Figure 4 is a plan view of the filter screen used in the present invention.
Figure 3:
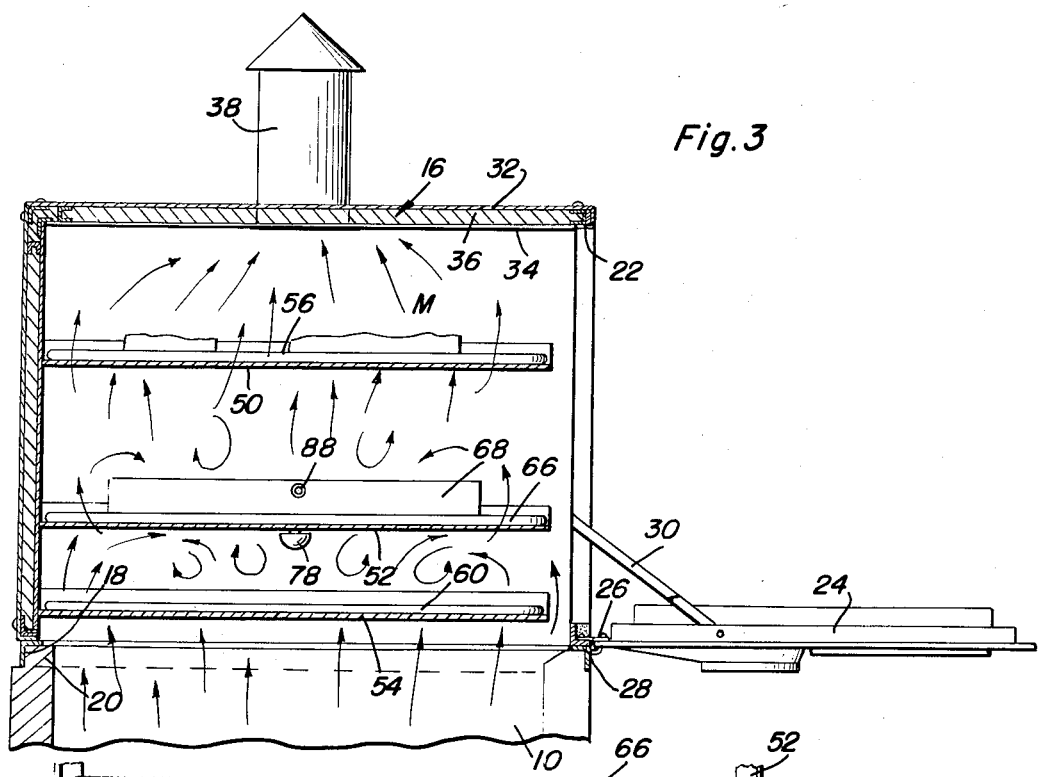
Figure 3 is a vertical sectional view taken substantially on the plane of section line 3—3 of Figure 2.
Figure 5:
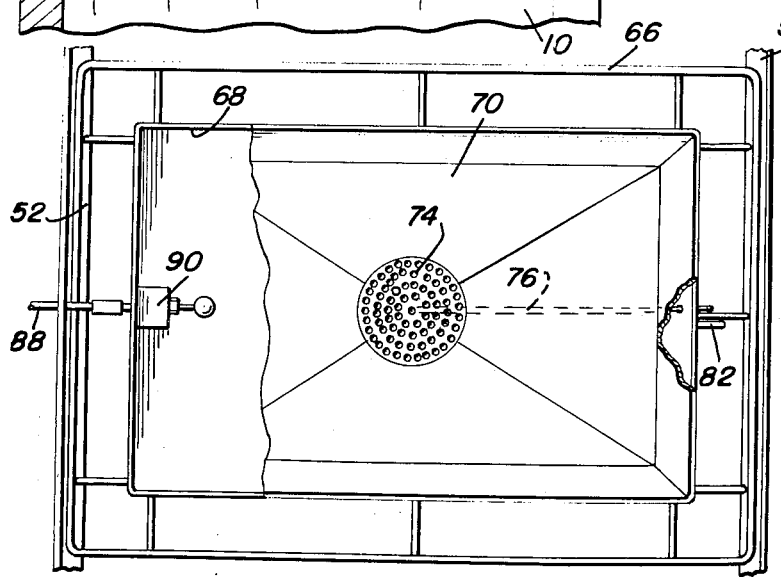
Figure 5 is a plan view of the combined water reservoir and grease collector used in the present invention and with parts thereof broken away for the convenience of explanation; and, Figure 6 is a plan view of the meat rack used in the present invention.

A heating chamber or casing member 16 is removably supported on the fire box 10 and includes an open bottom that registers with the open top of the fire box. A substantially rectangular angle iron base 18 supports the heating chamber and is suitably secured to the lower end of the heating chamber. The base 18 fits over and is suitably removably secured to the reduced upper edge 20 of the vertical walls forming the fire box, as shown in Figure 3.

The forward portion of the heating chamber 16 is provided with an access opening 22 that is adapted to be closed by a vertically swingable door 24 hinged, as at 26, to the forward base part 28. Arms 30 pivoted to the door 24 are slidably carried by the side portions of the heating chamber and have stops at their rear ends for engaging the side portions of the heating chamber to limit downward swinging movement of the door. Suitable latch means will be provided for releasably retaining the door raised and in its closed position.

All walls of the heating chamber are insulated and comprise inner and outer metallic sheets 32 and 34 between which an insulating material 36 is held. The door 24 is also insulated to retain the heating chamber satisfactorily heated when a fire is started in the fire box.

A stack 38 extends upwardly from the upper wall of the heating chamber and is provided with a damper (not shown) controlled by a thermostatic unit 40. Unit 40 is of known structure and is responsive to heat in the chamber 16 for actuating the damper. The unit 40 is provided with a finger knob pointer 42 and a dial 44, whereby the damper may be actuated to its open position when the temperature of air in the heating chamber reaches a predetermined degree.

Door 24 supports a thermometer 46 for indicating the temperature of air in the heating chamber. The thermometer 46 is of any suitable type frequently employed in conjunction with ovens and is mounted within a central opening in the door 24 below a window 48, of the door 24.

Three pairs of horizontally disposed vertically spaced angle iron guides 50, 52, and 54 are fixedly attached to the inner faces of the side walls of chamber 16. The upper pair of guides 50 slidably support a meat rack 56 that is slidable on the guides 50 into and out of the opening 22. The lower pair of guides 54 slidably support a filter screen 58 including foraminous member 60 having an opening 61 in which an imperforate metallic sheet 62 is fixed by straps 64 terminally attached to the member 60 and the sheet 62.

The intermediate guides 52 slidably support an open wire frame element or rack 66 on which there is supported a reservoir or pan 68 having an open top that receives a peripherally flanged grease collector pan 70. The central part of the pan 70 is formed within an opening from which a sleeve 72 depends and a perforated plate 74 is suitably held within sleeve 72 and is attached to a drain pipe 76 that extends through the flange of pan 68 to terminate over the intake spout 78 of an outlet pipe 80 extending through the chamber 16. Pan 68 is also provided with a drain or overflow pipe 82 that extends to the intake spout 78.

The pipe 76 is so supported on the chamber 16 that when rack 66 is slid into the chamber 16 on guides 52, the outlet ends of pipes 76 and 82 will be located directly above the spout 78. The pipe 76 will extend to any suitable disposal or collecting receptacle.

A water receptacle 84 is supported by a bracket 86 on the exterior of chamber 16 and includes a supply conduit 88 that extends into the chamber 16 and into the pan 68. A float controlled valve 90 at the outlet end of conduit 88 controls the flow of water from receptacle 84 into the pan 68 and will close the conduit 88 when the water in pan 68 reaches a predetermined level.

In practical use of the present invention, the door 24 is opened and rack 56 slid forwardly so that meat M can be placed thereon, the fire having previously been built in chamber 16. Then the rack 56 is moved back into the heating chamber 16 and door 24 is closed.

Screen 60 will prevent ashes from rising in the chamber 16 and entering the receptacles 68, 70 or contacting the meat. As the air is heated in chamber 16 water in reservoir 68 will boil to cause steam to contact the meat. Grease dripping from the meat will pass into pan 70 to exit through pipes 76, 80 and some of the grease may enter receptacle 68 to pass through pipes 82, 80.

It is preferred that each end wall of the casing member support a hand grip G, whereby the casing member may be handled during installation or transporting of the casing member.

Having described the invention, what is claimed as new is:

1. A cooker comprising a fire box having an open top, an open bottom heating chamber supported over the open top of the fire box and having a closure, a meat rack supported within the heating chamber, a reservoir supported in the heating chamber under the meat rack, said reservoir having water therein and constituting a steaming device for meat on the rack, and overflow outlet means for said reservoir, and a filter screen supported horizontally within the chamber below the reservoir and protecting meat on the rack from ashes.

2. A cooker comprising a fire box having an open top, a heating chamber supported over the open top and having a top wall and a closure, a stack extending upwardly from said top wall, a thermostatically controlled damper means in the stack, a meat rack supported within the chamber, a second rack supported within the chamber under the meat rack, an open top receptacle supported on the second rack and having a grease overflow means at its upper portion, a water container supported on the chamber and having a conduit extending to the receptacle, and a valve in said conduit and having a float operatively connected therewith and located in the receptacle, whereby a supply of water will be admitted into the receptacle when the water in receptacle decreases to a predetermined volume.

3. A cooker comprising a fire box having an open top, a heating chamber supported over the open top and having a top wall and a closure, a stack extending upwardly from said top wall, a thermostatically controlled damper means in the stack a meat rack supported within the chamber, a second rack supported within the chamber under the meat rack, an open top receptacle supported on the second rack and having a grease overflow means at its upper portion, a water container supported on the chamber and having a conduit extending to the receptacle, and a valve in said conduit and having a float operatively connected therewith and located in the receptacle, whereby a supply of water will be admitted into the said receptacle when the water in receptacle decreases to a predetermined volume, and a horizontally disposed filter screen removably supported within the chamber under the receptacle and preventing the passage of ashes upwardly into the receptacle and into contact with meat on the meat rack.

4. A cooker comprising a fire box having an open top, an open bottom heating chamber supported over the open top of the fire box and having a closure, a meat rack supported within the heating chamber, a reservoir supported in the heating chamber under the meat rack, said reservoir having water therein and having a grease collector pan thereabout for meat on the rack, and overflow outlet means for said reservoir including a drain pipe secured to and extending outwardly from said chamber, said drain pipe having an upwardly facing spout within the casing, and a drain conduit carried by the reservoir including a downwardly extending end overlying the spout when the reservoir is disposed completely within the chamber, and filter screen supported horizontally within the chamber below the reservoir and protecting meat on the rack from ashes, said filter screen comprising an elongated foraminous member having a central opening therein, and an imperforate metallic plate mounted in said opening.

5. In a cooker including a casing having a meat rack supported therein, a water pan removably supported in the casing under the rack, an upwardly facing grease collector pan supported within the top of the water pan in spaced relation to permit passage of steam from the water pan, said grease collector pan having a central opening therein, a sleeve having an upper end fixed in said opening, a perforated plate held within the sleeve, drain pipes extending through the water pan one of which is attached to the plate, each of said drain pipes having a downwardly extending end portion disposed exteriorly of said pans, and a drain tube secured to the casing and having an upwardly facing spout disposed with the casing under said downwardly extending end portions of said drain pipes.

6. A cooker comprising a firebox, an open bottom enclosure overlying said firebox for receiving heat therefrom, said enclosure having a top wall and an openable closure in a side wall, a meat supporting rack in said enclosure, an open top water receptacle disposed in said enclosure with the periphery thereof spaced from the side walls of the enclosure for permitting passage of heat upwardly around the periphery of the receptacle, said heat forming steam for assisting in the cooking of the meat, a grease collecting pan disposed in overlying relation to the water receptacle with the periphery of the pan spaced from the receptacle to permit water vapor to pass upwardly with the heat to assist in the cooking of the meat, said pan underlying the meat to receive grease therefrom, a drain line for said pan, an overflow drain line for said receptacle, a float controlled water supply connected to the receptacle for maintaining a predetermined water level, said overflow drain line discharging grease positioned on the top surface of the water which may enter between the peripheries of the pan and receptacle, a filter screen below the receptacle to prevent passage of ashes upwardly into contact with the meat and into the receptacle and pan, a stack in the top of the enclosure for exhausting gases, and thermostatic means controlling the exhausting of said gases.

References Cited in the file of this patent

UNITED STATES PATENTS

| 1,051,503 | Klein | Jan. 28, 1913 |
| 1,213,025 | Sabelberg | Jan. 16, 1917 |
| 1,456,382 | Kincannon | May 22, 1923 |
| 1,670,094 | Becker | May 15, 1928 |
| 1,837,924 | Rutherford | Dec. 22, 1931 |
| 2,097,793 | Howell | Nov. 2, 1937 |
| 2,109,796 | Hirschenfeld | Mar. 1, 1938 |
| 2,181,847 | Finizio | Nov. 28, 1939 |
| 2,338,156 | Allen | Jan. 4, 1944 |
| 2,377,873 | Finizio | June 12, 1945 |
| 2,568,022 | Parker | Sept. 18, 1951 |
| 2,608,190 | Winning et al. | Aug. 26, 1952 |
| 2,665,682 | Eastep | Jan. 12, 1954 |

FOREIGN PATENTS

| 1,598 | Austria | June 25, 1900 |
| 521,256 | Great Britain | May 16, 1940 |